United States Patent
Loebner et al.

[19]

[11] Patent Number: 5,923,698
[45] Date of Patent: Jul. 13, 1999

[54] METHOD OF OPERATING AN ARC FURNACE, AND AN ARC FURNACE

[75] Inventors: Andreas Loebner, Herrenschwanden; Jan Oelscher, Birmenstorf; Sven-Einar Stenkvist, Brugg, all of Switzerland

[73] Assignee: Concast Standard AG, Zurich, Switzerland

[21] Appl. No.: 08/805,677

[22] Filed: Feb. 27, 1997

[30] Foreign Application Priority Data

Mar. 28, 1996 [DE] Germany .................... 196 12 383

[51] Int. Cl.$^6$ .................................................. F27D 3/00
[52] U.S. Cl. .................................. 373/82; 75/10.58
[58] Field of Search .............................. 373/82, 81, 85; 422/232; 75/10.58; 266/186

[56] References Cited

U.S. PATENT DOCUMENTS

| | | | |
|---|---|---|---|
| 562,400 | 6/1896 | King et al. | 373/82 |
| 3,159,702 | 12/1964 | Cordier | 266/186 |
| 3,215,522 | 11/1965 | Kuhlmann | 75/10.58 |
| 3,471,626 | 10/1969 | De Weese et al. | 373/82 |
| 3,585,269 | 6/1971 | Krause et al. | 373/82 |
| 4,031,309 | 6/1977 | Chitil et al. | 373/81 |
| 4,147,887 | 4/1979 | Yasukawa et al. | 373/82 |
| 4,410,996 | 10/1983 | Svensson | 373/7 |
| 4,816,230 | 3/1989 | Bortnik et al. | 422/232 |
| 5,410,566 | 4/1995 | Steins et al. | 373/82 |
| 5,566,200 | 10/1996 | Konig et al. | 373/82 |
| 5,748,666 | 5/1998 | Anderson et al. | 373/82 |

FOREIGN PATENT DOCUMENTS

| | | |
|---|---|---|
| 0058774B1 | 9/1982 | European Pat. Off. . |
| 0637634A1 | 2/1995 | European Pat. Off. . |

OTHER PUBLICATIONS

"Der Gleichstrom–Lichtbogenofen, ein kostengunstiges Schmelzaggregat", ABB Technik Oct. 1992, pp. 3–10.

*Primary Examiner*—Tu B. Hoang
*Assistant Examiner*—Quang Van
*Attorney, Agent, or Firm*—Burns, Doane, Swecker & Mathis, L.L.P.

[57] ABSTRACT

In order to avoid damage to the inner walls of the arc furnace (1) and a reduction of the electric power when material (5) to be melted has been partly burned down in an arc furnace (1), additives (10) are fed to the filling opening of a hollow electrode (7) by means of a loose-material conveyor (25) during this critical melting phase. An arc (6) between the hollow electrode (7) and a melt (4) in the arc furnace (1) is thereby shortened. A loose-material container (9) is arranged at the end of the loose-material conveyor (25) at a distance from the electrode and can easily be separated from the hollow electrode (7) in order to permit the tilting of the arc furnace (1) to empty out the melt (4). Problematic waste materials which are to be disposed of, such as for example filter dust, can be added to the additives (10).

10 Claims, 3 Drawing Sheets

METHOD OF OPERATING AN ARC FURNACE, AND AN ARC FURNACE

BACKGROUND OF THE INVENTION

1. Field of the Invention

The starting point of the invention is a method of operating an arc furnace, particularly for steelmaking, and an arc furnace for carrying out the method.

2. Discussion of Background

Swiss house journal ABB Technik, 10/1992, pp. 3–10, describes a device for the melting-down of scrap, use is there made of a solid graphite electrode in a direct-current arc furnace, in which the furnace cover is movable and the furnace vessel tiltable in order to tip out the slag and the finished melt. If the direct-current arc furnace is used as a reduction furnace for the continuous charging and processing of fine charges, it is fed either through a central opening in the electrode, directly into the arc furnace plasma, or through one or more charging doors next to the electrode. If a premixed fine-grained charge is fed through the hollow electrode, the charging mass flow is controlled so that equilibrium with the arc power can always be maintained. The two-part charging tube has a quick-release coupling and is electrically insulated from a filling hopper of the hollow electrode. The charging apparatus can be swung aside in order to uncouple the bottom part of the charging tube. This furnace has a fixed cover and a stationary shell. The metal and the slag are run off through tap holes at different heights. The furnace transformer is designed to supply the rated power over a wide voltage and current range, so that the arc furnace can be operated at full load. The current supply system must therefore be made sufficiently flexible to enable this optimum to be adjusted in practical operation. As a rule four or five taps are provided on the transformer in order to enable this range to be covered.

Arc furnaces for reduction processes are not tiltable and have a rigidly mounted cover.

In connection with the relevant prior art, reference is also made to EP 0 058 774 B1, from which a tiltable arc furnace having a plurality of solid electrodes for steelmaking is already known, in which loose material is likewise introduced into the arc furnace from a loose-material container via a loose-material conveyor. The loose-material container is here arranged on the loose-material conveyor at a distance from the electrode.

From EP 0 637 634 A1 a method of producing a steel melt in an arc furnace is known, wherein fine-grained solids and/or gases pass through a hollow electrode directly into the arc in order to obtain an arc enclosed in a foamed slag over the flat bath period. In order to form the foamed slag it is also possible for filter dust to be fed in.

SUMMARY OF THE INVENTION

Accordingly, one object of the invention is to provide a novel method of operating an arc furnace, particularly for steelmaking, and to develop further an arc furnace of the type initially mentioned above in such a manner that an improvement of the efficiency of the arc furnace is achieved.

The main advantage of the invention consists of a higher power density of the arc furnace as the result of a shorter arc.

Since the additives have a deionizing action on the plasma zone in which the arc burns, the arc is shortened with the same voltage and the same current. Depending on particle size, rate of feed and type of material of the additives, lateral heat radiation is thus reduced in comparison with heat radiation in the direction of the melt.

With the same length of arc, it is thus possible to work with a higher voltage. The arc furnace can therefore be operated with a higher electrical power for the same electrode diameter (same current). Hot spots are thus made less harmful.

Another advantage of the invention is that a reduced load on the hollow electrode and on the lining of the arc furnace is achieved. Thinner electrodes permit an extremely high saving of costs.

The additives required for the metallurgical processes are fed in at the optimal point. Since for example carbon does not have to be unnecessarily dispersed, waste gases are reduced.

If at least a part of the substances which have to be introduced in any case, such as for example lime and coal, are used as additives, they are utilized particularly effectively.

A way of processing problematic waste at almost zero cost is made possible. Steelworks waste, such as for example filter dust, can be added to the additives and can thus be disposed of without causing problems.

According to an advantageous development of the invention it is possible to prevent gas from passing out of the hollow electrode.

The tilting of the arc furnace into its end positions and the swiveling of the hollow electrode and the furnace cover do not entail any additional operating costs. Additives can be introduced into the hollow electrode in all tilted positions of the arc furnace during melting operations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
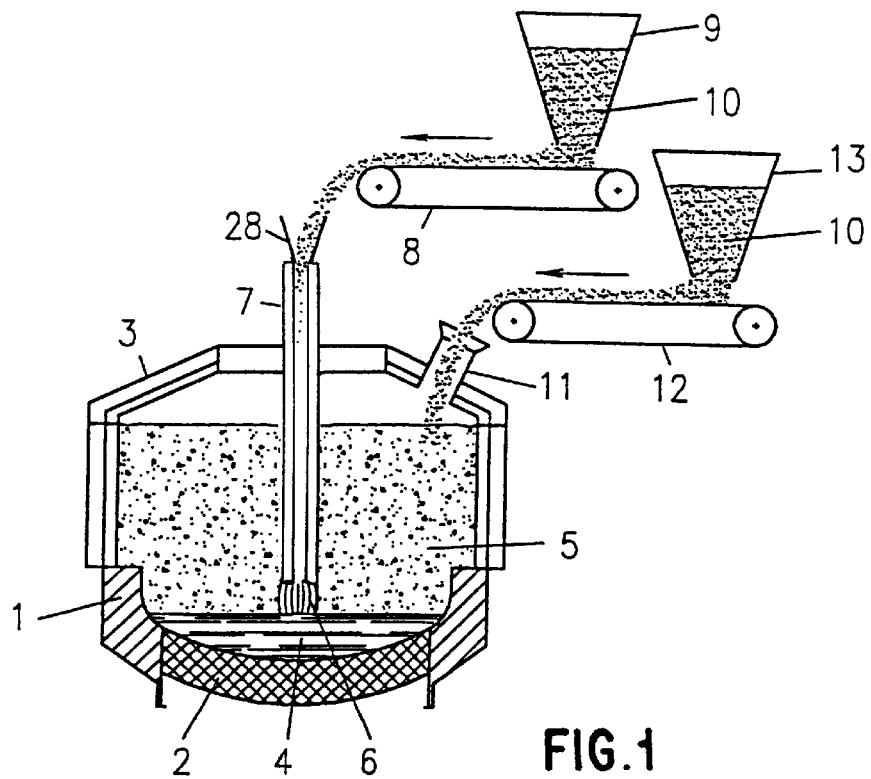
FIG. 1 shows an arc furnace filled with scrap and provided with a conventional conveyor device for additives and a conveyor device which conveys additives into a hollow electrode of the arc furnace.

Referring now to the drawings, wherein like reference numerals designate identical or corresponding parts throughout the several views, in FIG. 1 is shown a direct current arc furnace or arc furnace (1) comprising a bath electrode (2), a detachable furnace cover (3) having a central opening for the passage of a hollow electrode (7) and having a conventional feed opening (11) for supplying additives (10). An arc (6), which melts scrap (5), burns between the hollow electrode (7) and a steel melt or melt (4). The scrap (5) is fed into the arc furnace (1), with the furnace cover (3) open, before the melting process is started. From a first loose-material container (9) for additives (10), for example coal and lime, the latter are conveyed via a first conveyor device (8) into a filling opening (28) of the hollow electrode (7). It is important that the loose-material container (9) is arranged at a distance from the electrode and is thus subjected to only a low thermal load. Additives (10) are in addition conveyed from a container (13) to the feed opening (11) via another conveyor device (12).

Figure 2:
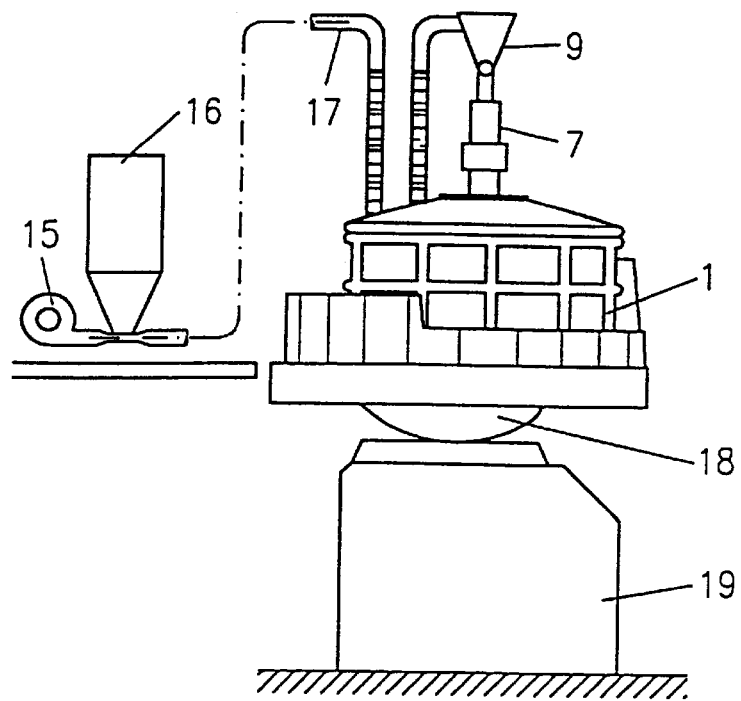
FIG. 2 shows a tiltable arc furnace provided with two storage silos for additives which are connected by means of a hose.

FIG. 2 shows an arc furnace (1) according to FIG. 1, from which it can be seen that the additives (10) are conveyed by means of a pneumatic loose-material conveyor or forced-draft fan (15) from a loose-material store container or second loose-material container (16), via a hose connection or through a hose (17), into the first loose-material container (9). Instead of a forced-draft fan (15) it is for example also possible to use a suction conveyor as usually employed in conveying or an air-pressure conveyor. The loose-material container (9) is arranged, at right angles to the plane of the drawing, behind and at a distance from the hollow electrode (7), in accordance with FIG. 1. (18) designates a rocker of the arc furnace (1), which enables the arc furnace (1) to be rolled on a flat support surface of a furnace foundation (19) and thus allows the arc furnace (1) to be tilted without additional operating expense.

Figure 3:
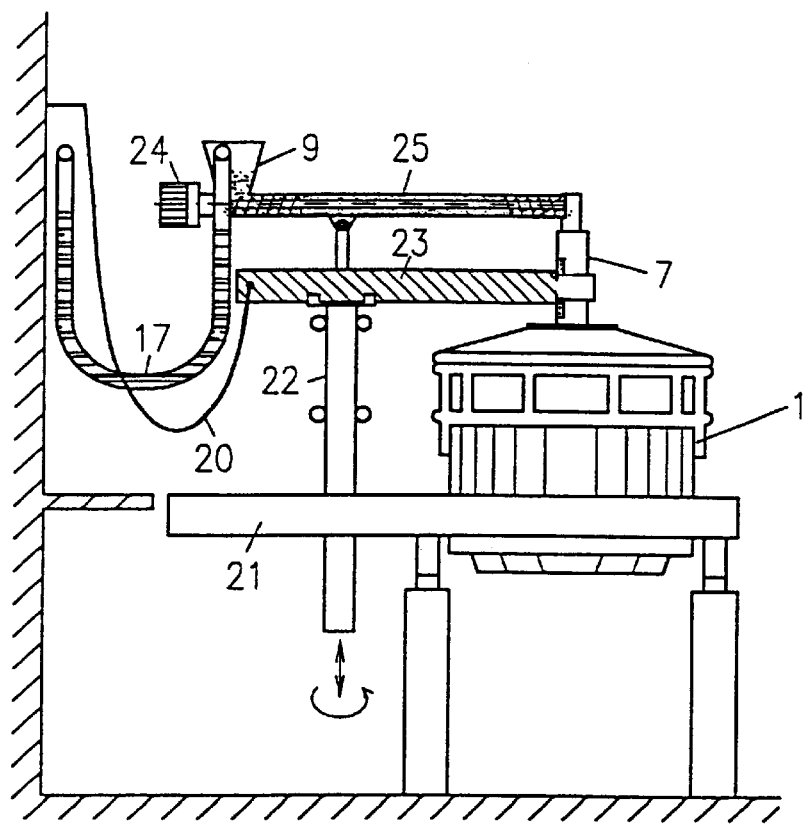
FIG. 3 shows the arc furnace of FIG. 2 with an electrode adjustment device and a loose-material conveyor pivoted thereon.
Figure 4:
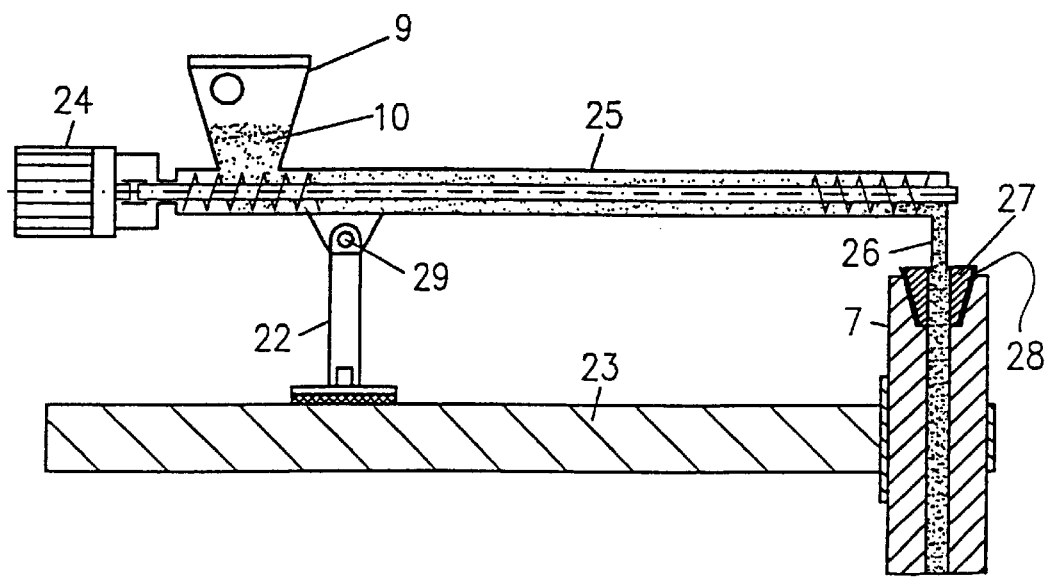
FIG. 4 shows in detail a loose-material conveyor according to FIG. 3, FIGS. 5 to 7 show arc furnaces with different levels of scrap filling.

FIG. 3 shows a tiltable arc furnace (1) and an electrode adjustment device (22) which is arranged in a furnace platform (21) for tilting or rotation and vertical adjustment. The electrode adjustment device (22) has a horizontal electrode carrier arm (23) which is mechanically and electrically connected on the one hand to a current supply (20) and on the other hand to the hollow electrode (7). At the same time, said adjustment device is connected, with electrical insulation, via a pivot joint (29) to a loose-material conveyor (25) which can be seen in greater detail in FIG. 4. Said conveyor conveys the additives (10) from the loose-material container (9) by means of a motor (24), whose speed of rotation is adjustable, and of a worm drive connected thereto, to an electrode filler tube (26) connected at its end. Said filler tube is guided into a central opening in an electrically insulating hollow filler stopper (27), which is seated gastightly in the filling opening (28) of the hollow electrode (7) and can easily be separated from the hollow electrode (7) by turning the loose-material conveyor (25) about the pivot joint (29). The loose-material conveyor (25) can now easily be swung away, so that the replacement of a hollow electrode (7) is not hindered. Only a supporting bearing is situated on the hot hollow electrode (7) while the sensitive parts [motor (24) and level sensors (not illustrated)] are attached at the cold end of the loose-material conveyor (25). The loose-material conveyor (25) can also be at the potential of the hollow electrode (7); in this case the hose (17) effects electrical separation from the loose-material conveyor (16).

It is important that the additives (10) are transported from a stationary loose-material store container (16) into an intermediate silo (9) which is attached at the rear end of the loose-material conveyor (25) which moves together with the electrode carrier arm (23).

It is obvious that instead of a forced-draft fan (15) a telescopic tubular chute or another conveyor plant, which either [lacuna] into an elongated silo or has joints at its ends, can be used (not illustrated).

Figures 5, 6, 7:
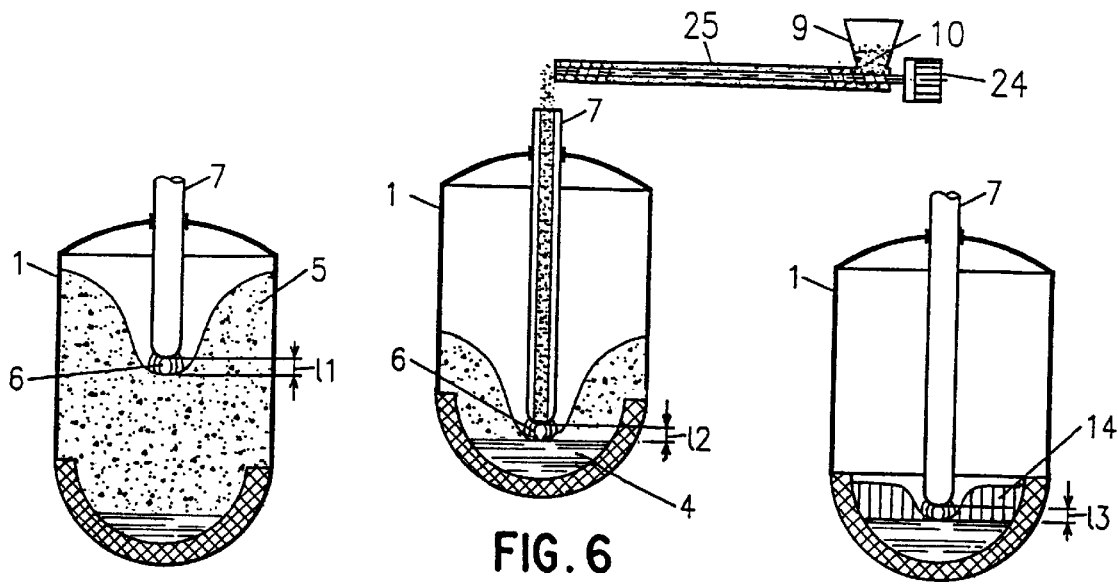

FIGS. 5 to 7 show different filling states of the arc furnace (1) with scrap (5)—FIG. 5 in the filled state with a length (11) of the arc (6) of approximately 60 cm, FIG. 6 in a state in which over 50% has been burned away, with a length (12) of the arc (6) of approximately 30 cm, and FIG. 7 in the completely burned-away state with a length (13) of the arc (6) of approximately 30 cm. Only in the partly burned-away filling state shown in FIG. 6 are additives (10) conveyed through the hollow electrode (7), whereby the arc length (11) is shortened to (12). A specific melting power (P), cf. FIG. 9, can thereby be brought to high values without danger to furnace components.

In a starting phase (a) of the melting, according to FIG. 5, in which the arc furnace (1) is completely filled with scrap (5), the energy of the arc (6) does not reach the furnace walls. In an end phase (c) of the melting, according to FIG. 7, the scrap (5) has been completely melted down and the steel bath (4) is covered with a foaming slag (14), which also envelops the arc (6). In a critical phase (b) of the melting, according to FIG. 6, in which the scrap (5) has been melted down to such an extent that the inner side walls of the arc furnace (1) are no longer completely covered with scrap (5) but sufficient melt (4) is not yet present to form a foaming slag (14), a large part of the energy of the arc (6) is lost or leads to damage to the inner side walls of the arc furnace (1) if steps are not taken to provide protection. In order to avoid such damage, the power of the arc (6) must be lowered, which reduces a specific electric melting power (P), cf. FIG. 8.

Figure 8:
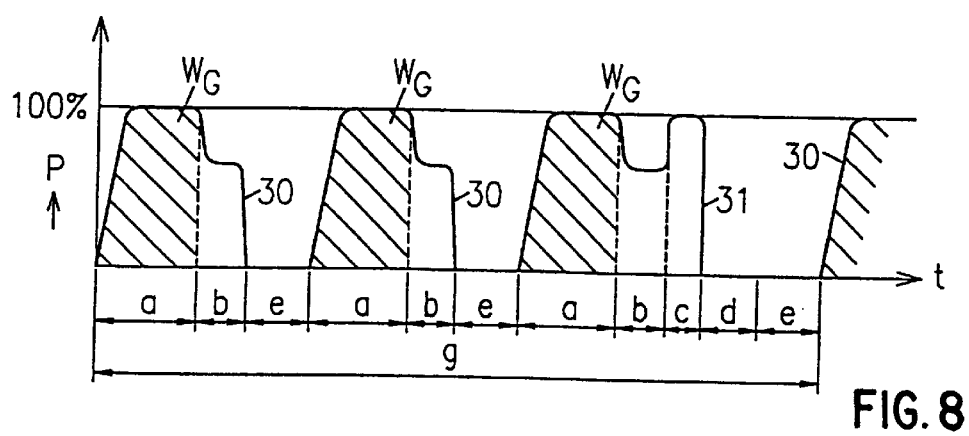
FIGS. 8 and 9 show melting power diagrams for a melting cycle, without and with the supply of additives, in the melting state according to FIG. 6.
Figure 9:
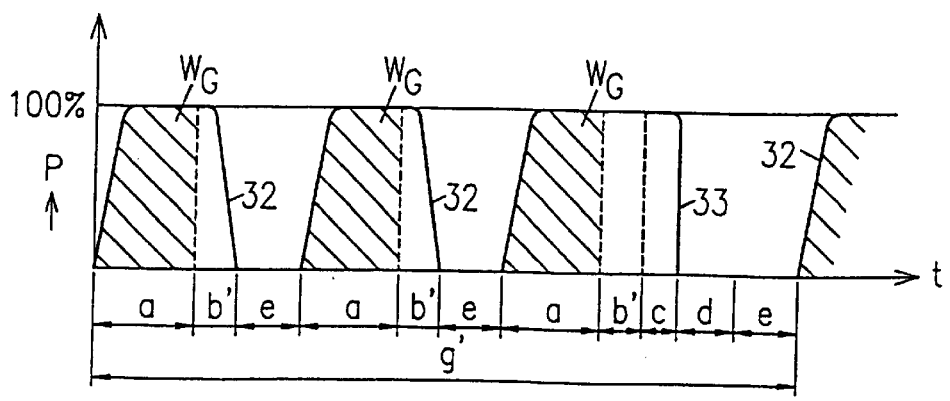

In FIGS. 8 and 9 the relative specific electric melting power (P) per tonne of material (5) to be melted is plotted in % on the ordinates against the time (t) in arbitrary units on the abscissa.

FIG. 8 shows two successive identical power curves (30), each with a starting phase (a) of equal length in which the melting power (P) rises from 0 to 100% and is kept approximately constant until a predeterminable energy limit value ($W_G$), which is represented in the starting phase (a) by the hatched areas under the power curves (30–33), is reached. In the critical phases (b) of approximately equal length which respectively then follow, without the addition of additives (10), the melting power (P) is adjusted to a reduced power level, in order to protect the furnace walls, and finally to 0. The critical phases (b) are followed in each case by a scrap refill phase (e). A subsequent third power curve (31) differs from the power curves (30) in respect of the final end phase (c), in which the melting power (P) rises from the reduced power level to almost 100% and is finally adjusted to 0. Then follows a melt discharge phase (d) and thereupon once again a scrap refill phase (e), which terminates a melting cycle (g) with 3 scrap refill phases (e).

FIG. 9 shows a power diagram corresponding to FIG. 8 in the case of the supply of additives (10) during the reduced critical phases (b'), which replace the critical phases (b) according to FIG. 8, so that in all a reduced melting cycle time (g') results, cf. power curves (32)–(33) which correspond to the power curves (30)–(31) according to FIG. 8. The supply of additives (10) is started as soon as the melting energy consumed reaches the predeterminable energy limit value ($W_G$), so that practically no power drop occurs. This energy limit value ($W_G$) lies in the range from 30% to 90%, preferably in the range from 60% to 70% of the total melting energy per scrap filling. On the last scrap filling for each melting cycle the supply of additives (10) can be discontinued when the foaming slag phase is reached, which may be the case at approximately 90% of the total melting energy.

EXAMPLE

In the case of a melt with three scrap refill phases (e), it was possible to shorten the previous melting cycle time (g)

of 60 minutes by 5 minutes, which with an arc furnace (1) with a scrap filling of 100 t and an operation lasting 320 working days gives a production increase of 8%, that is to say from 770 kt/a to 830 kt/a. Energy consumption fell by 40 kwh/t. The final consumption of hollow electrodes (7) fell by 0.2 kg/t of steel.

Obviously, numerous modifications and variations of the present invention are possible in light of the above teachings. It is therefore to be understood that within the scope of the appended claims, the invention may be practiced otherwise than as specifically described herein.

List of Designations

1 Arc furnace
2 Bath electrode
3 Furnace cover of 1
4 Melt, steel melt
5 Material to be melted, scrap in 1
6 Arc
7 Hollow electrode
8, 12 Conveyor devices
9 First loose-material container, intermediate silo
10 Loose material, additives
11 Feed opening in 3
13 Container for additives
14 Foaming slag (14)
15 Forced-draft fan
16 Second loose-material container, loose material store container
17 Hose connection, hose
18 Spherical bottom of 1
19 Furnace foundation
20 Current supply to 7
21 Furnace platform
22 Electrode adjustment device
23 Electrode carrier arm
24 Motor
25 Loose-material conveyor
26 Electrode filler tube
27 Hollow filler stopper
28 Filling opening of 7
29 Pivot joint
30–33 Power curves
a Starting phase of melting
b Critical melting phase without feeding loose material
b' Melting phase with feeding of loose material, reduced critical phase
c Final phase of melting
d Melt discharge phase
e Scrap refill phase
g, g' Melting cycle times
l1–l3 Arc lengths
p Specific electric melting power per tonne of material to be melted
t Time
$W_G$ Energy limit value

What is claimed as new and desired to be secured by Letters Patent of the United States is:

1. A method of operating an arc furnace, said arc furnace including side walls, comprising the steps of:

melting solid material to a melt by an open arc with at least one hollow electrode until the beginning of a critical melting phase in which said solid material is partly melted down in said arc furnace, such that the heat radiation of said arc on said furnace side walls increases; and continuing melting of said solid material and simultaneously conveying at least one additive through said at least one hollow electrode into said melt.

2. The method as claimed in claim 1, wherein said solid material melted in said melting step has a total melting energy, and said conveying step begins after an electric melting energy ($W_G$) in the range from 30% to 90% of said total melting energy has been reached.

3. The method as claimed in claim 2, wherein said conveying step begins after an electric melting energy ($W_G$) in the range from 60% to 70% of said total melting energy has been reached.

4. An apparatus usable with an arc furnace comprising:

a hollow electrode having a filling opening;

a movable electrode carrier arm connected to said hollow electrode for moving said hollow electrode relative to said arc furnace;

a first loose-material container;

a first loose-material conveyor for feeding loose material from said first loose-material container to said filling opening of said hollow electrode, said first loose-material conveyor having a rear end;

said first loose-material container being arranged at a distance from said electrode selected to subject said first loose-material container to a low thermal load;

said first loose-material container being attached at said rear end of said first loose-material conveyor and moving together with said electrode carrier arm.

5. The apparatus as claimed in claim 4, further comprising a movable electrode adjustment device for moving said electrode relative to said arc furnace, said movable electrode adjustment device comprising said movable electrode carrier arm, said movable electrode adjustment device being vertically adjustable and movable in a mode selected from the group consisting of rotation and tilting, wherein said first loose-material conveyor is pivotally connected to said electrode adjustment device.

6. The apparatus as claimed in claim 4, further comprising an electrically insulating, hollow filler stopper and wherein said first loose-material conveyor is gas-tightly and detachably connected to said filling opening of said hollow electrode via said electrically insulating, hollow filler stopper.

7. The apparatus as claimed in claim 4, further comprising:

a second loose-material container; and a conveyor device;

wherein said first loose-material conveyor is connected to said second loose-material container via said conveyor device.

8. The apparatus as claimed in claim 4, further comprising:

a second loose-material container; and an electrically insulating hose;

wherein said first loose-material container is connected to said second loose-material container via said electrically insulating hose.

9. The apparatus as claimed in claim 4, further comprising said loose material which contains at least one additive.

10. The apparatus as claimed in claim 4, further comprising said arc furnace, and wherein said arc furnace is movable in a mode selected from the group consisting of rotation and tilting.

* * * * *